United States Patent [19]
Christensen

[11] Patent Number: 5,395,019
[45] Date of Patent: Mar. 7, 1995

[54] PORTABLE UTILITY CONTAINER WITH LATCH AND MOUNT

[76] Inventor: David Christensen, 11 Moores Mill Rd., Pennington, N.J. 08534

[21] Appl. No.: 61,744

[22] Filed: May 17, 1993

Related U.S. Application Data

[63] Continuation-in-part of Ser. No. 802,227, Dec. 4, 1991, Pat. No. 5,255,832.

[51] Int. Cl.[6] ............................................. B60R 9/00
[52] U.S. Cl. ................................. 224/42.42; 224/319; 296/376
[58] Field of Search ................. 224/24.42, 309, 315, 224/319, 329, 330; 296/37.1, 37.6, 37.7

[56] References Cited

U.S. PATENT DOCUMENTS

| | | |
|---|---|---|
| 3,454,250 | 7/1969 | Gley . |
| 3,456,929 | 9/1969 | Chorey ............................ 224/329 X |
| 4,065,092 | 12/1977 | Spinks, Sr. et al. . |
| 4,230,248 | 10/1980 | Finnegan . |
| 4,249,684 | 2/1981 | Miller et al. ..................... 224/319 X |
| 4,444,427 | 4/1984 | Martin . |
| 4,848,629 | 7/1989 | Mobius .............................. 224/309 X |
| 4,974,766 | 12/1990 | DiPalma et al. ................. 224/315 X |
| 4,984,837 | 1/1991 | Dise . |
| 5,007,568 | 4/1991 | Da Vault . |
| 5,046,652 | 9/1991 | Shanok et al. ................... 224/309 X |
| 5,181,639 | 1/1993 | Kvanna ............................ 224/319 X |
| 5,275,320 | 1/1994 | Duemmler ....................... 224/330 X |
| 5,285,942 | 2/1994 | Wills ................................. 224/309 X |

Primary Examiner—Allan N. Shoap
Assistant Examiner—Christopher McDonald
Attorney, Agent, or Firm—Kenneth P. Glynn; Diane L. Ferrone

[57] ABSTRACT

The present invention is directed to a universal equipment mounting device. It includes a portable utility container having a bottom, sides and a top and capable of being locked; a mount adapted for interlocking with the portable utility container, and a latch attached to either of the portable utility container or the mount and adapted to interact with the other of the portable utility container and the mount so as to releasably connect the portable utility container to the mount. The invention is further characterized in that one of the portable utility container and the mount contains a male counterpart of a male-female interlock and the other of the portable utility container and the mount contains a female counterpart of a male-female interlock. The device is adapted such that the portable utility container is slidable onto the mount and is further securable thereto by means of the latch. In preferred embodiments, a plurality of mounts is used.

9 Claims, 3 Drawing Sheets

PORTABLE UTILITY CONTAINER WITH LATCH AND MOUNT

REFERENCE TO RELATED APPLICATION

This application is a Continuation-In-Part of U.S. patent application Ser. No. 07/802,227, filed on Dec. 4, 1991, now U.S. Pat. No. 5,255,832, and entitled "Universal Equipment Mounts, Enclosed Mounts, And Mounting Rails" by the inventor herein.

BACKGROUND OF THE INVENTION

1. Field of the Invention

This invention relates to portable utility containers which include latch capabilities, and to mounts for mounting the containers. These utility containers may, for example, be removably mounted on such mounts which may be attached, for example, to a vehicle, such as a pick-up truck bed or a boat.

2. Prior Art Statement

With the portability of expensive tools and equipment and the increase in theft, a need has arisen to secure valuables which are typically transported by open vehicle, e.g. a pick-up truck, and/or mounted on such vehicles for operation at remote sites. Further, tools and other equipment are taken to and left unattended at worksites and must likewise be secured. Other valuables such as vacation items, exhibits and personal items of a general nature may likewise need to be secured temporarily or long term. The present invention is directed to universal equipment mounts for securely mounting and latching utility containers thereto. Some prior art addresses such problems, and the following is exemplary:

U.S. Pat. No. 4,444,427 teaches an auxiliary structured element for pick-up cargo beds which includes a four sided frame and subsequent cross members for mounting a deck, e.g. a top with an access door.

U.S. Pat. No. 4,984,837 is directed to a load support assembly for pick-up trucks. This device has vertical mounting supports and a tiltable load support cross member. It is used for transporting items in the cargo bed tilted upwardly and forwardly; it is cab mounted and cannot be used for portable utility containers as in the present invention.

U.S. Pat. No. 3,454,250, U.S. Pat. No. 4,230,248 and U.S. Pat. No. 4,065,092 described various types of clamping mechanisms and fasteners.

U.S. Pat. No. 5,007,568 describes a truck sidewall mounted chainsaw carrier with locking capabilities.

Notwithstanding the above prior art, the present invention universal equipment mounts, portable utility containers and latch combinations are neither taught nor rendered obvious.

SUMMARY OF THE INVENTION

The present invention is directed, in combination, to a universal equipment mount, a portable utility container and a latch, for attachment to a base item, such as a table, a vehicle, a boat or otherwise. The mount includes a base plate which has a continuously identical cross-section, at least in part, for the sliding of a portable utility container thereon and off, and has into at least a portion of its length, a male or female counterpart of an interlock. By "interlock" is meant a fitted male and female design whereby the male counterpart inserts into the female counterpart to secure one to the other in a direction which is typically at right angles to the direction of insertion. Additionally, due to the inclusion of a latch in the present invention device, the male and female interlock counterparts are secured in the direction of insertion as well. That is, the interlock prevents lateral movement and the securing latch prevents transactional movement.

BRIEF DESCRIPTION OF THE DRAWINGS

The present invention will be more fully appreciated when the specification herein is taken in conjunction with the drawings appended hereto, these drawings are as follows.

DETAILED DESCRIPTION OF THE PRESENT INVENTION

As mentioned above the present invention involves a universal equipment container, i.e., a portable utility container, a latch and a mount in combination.

Thus it is an objective of the present invention to provide a mount to which a universal equipment container may be secured in both its inserted direction and in directions nonparallel with the direction of insertion by use of a male-female interlock arrangement. In the present invention device, the mount has one of either the male or female counterpart of the interlock and the container includes the other of the male or female counterpart of the interlock.

It is a further objective of the present invention to provide an enclosed latch for securing the portable utility container so that the latch can be released only after the container is opened. Thus, valuable items such as tools will be securely mounted.

Figure 1:
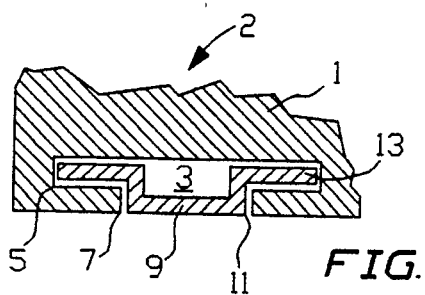
FIGS. 1, 2 and 3 show cut end views of different embodiments of interlocks used in the present invention device.

Referring now to FIG. 1 there is shown a present invention device 2 illustrated as a cut end corner portion, without latching means, to illustrate the concept of a male-female interlock. Here, container corner 1 has a female counterpart "T" slot 3 with a wide aspect 5 and a narrow aspect 7. This female counterpart has a corresponding male counterpart in the form of mount 9 which includes narrow width section 11 and wide section 13. Container 1 slides onto mount 9 and container 1 is thereby held in place as to movement nonparallel to the direction of sliding (i.e. the direction of insertion of mount 9 into container). The latch mechanism not shown here is discussed with respect to other figures and any such latch may be used here.

It can be seen that the mount must have a virtual continuous cross-section of identical shape at least along a predetermined length, that being the length of the mount which is inserted into the container. Further, while the mount is shown herein in various figures as being slidable with respect to an interlock counterpart on the bottom of a container, side mounts and side interlock counterparts could be used, as could interlock arrangements on tops of containers or configurations, e.g. one side/one top, without deviating from the scope or intent of the present invention.

Figure 2:
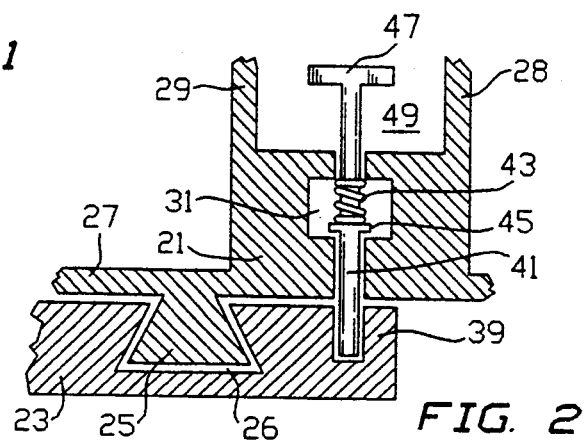

FIG. 2 illustrates an end cut view of container 21, mount 23 and latch 41. In this case, container 21 has a trapezoidal male counterpart 25 for the interlock located on its bottom 27, and mount 23 has corresponding female counterpart 26, as shown. Additionally, a separate compartment formed by walls 28 and 29 of container 21 house latch 41. There is opening 31 for spring 43 which pushes down on bar 45 of latch 41 to maintain latch 41 in a downward position. When container 21 is slid onto mount 23, the user either pulls up on latch 41 or a strike track pushes latch 41 up until it drops into hole 39 to secure the container 21 relative to the sliding direction along mount 23. Mount 23 itself would be bolted, welded or otherwise affixed to a rail, a base or other support on a vehicle such as a pick-up truck bed, a boat, a work table, a motorcycle, or would be closable and lockable and, when locked, releasing latch 41 would not be possible. Thus, the container 21 would be portable, removable, yet securable and could be used to store and thus mount any equipment desired, depending upon the particular size and shape of the container.

Figure 3:
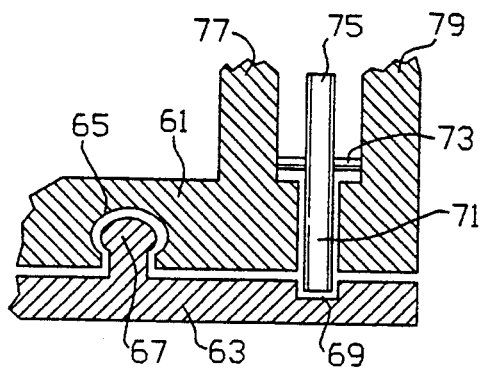

FIG. 3 shows an end cut view of another present invention device which includes container 61, latch 71 and mount 63. The mount 63 has a male bulbous or eyelet interlock counterpart 67 and a slot 69 for receiving latch 71. In this case, latch 71 is a swing or pivot latch which rotates on pin 73. The user must push the portion 75 back to raise latch 71 above slot 69 for moving container 61 relative to mount 63. As can be seen, the structure of container 61 includes a female interlock counterpart 65, and walls 77 and 79 for supporting pin 73 and isolating latch 71.

It should now be seen that the male-female interlocks can have any workable cross-section, i.e., it must have some shape with a wider dimension portion and a narrower dimension portion with the wide portion being further into the other counterpart to obtain the desired interlocking result. Also, either the male or the female may be located on the mount or on the container.

Figure 4:
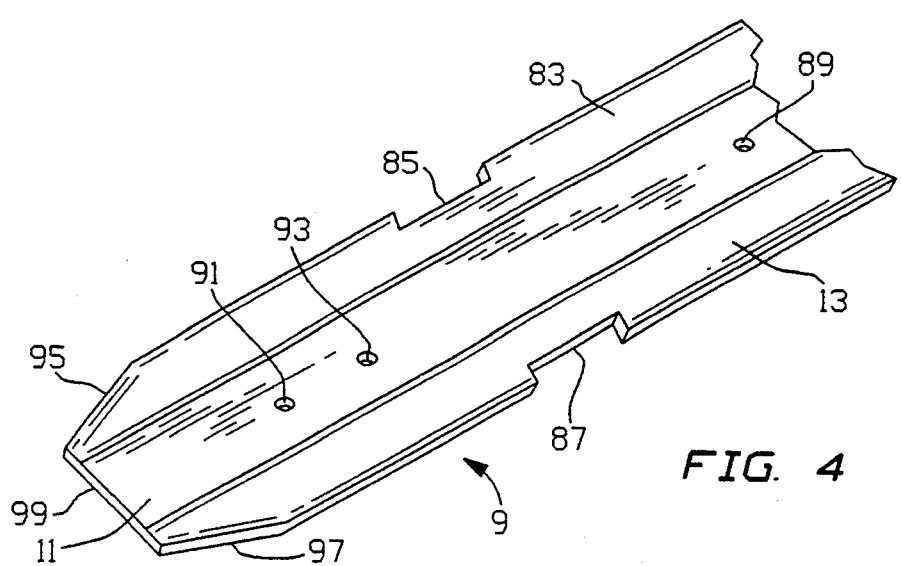
FIG. 4 shows an oblique view of a mount of the present invention device male interlock counterpart shown in FIG. 1.

FIG. 4 shows an oblique view of one version of mount 9 shown in FIG. 1. Narrower base portion 11, includes holes 89, 91 and 93 for bolting or riveting the mount 9 to an item. Flanged sections 13 and 83 have strikes 95 and 97, as well as latch-receiving detents 85 and 87. A similar mount, mount 121, is shown in FIG. 5 and would operate in the same manner.

Figure 5:
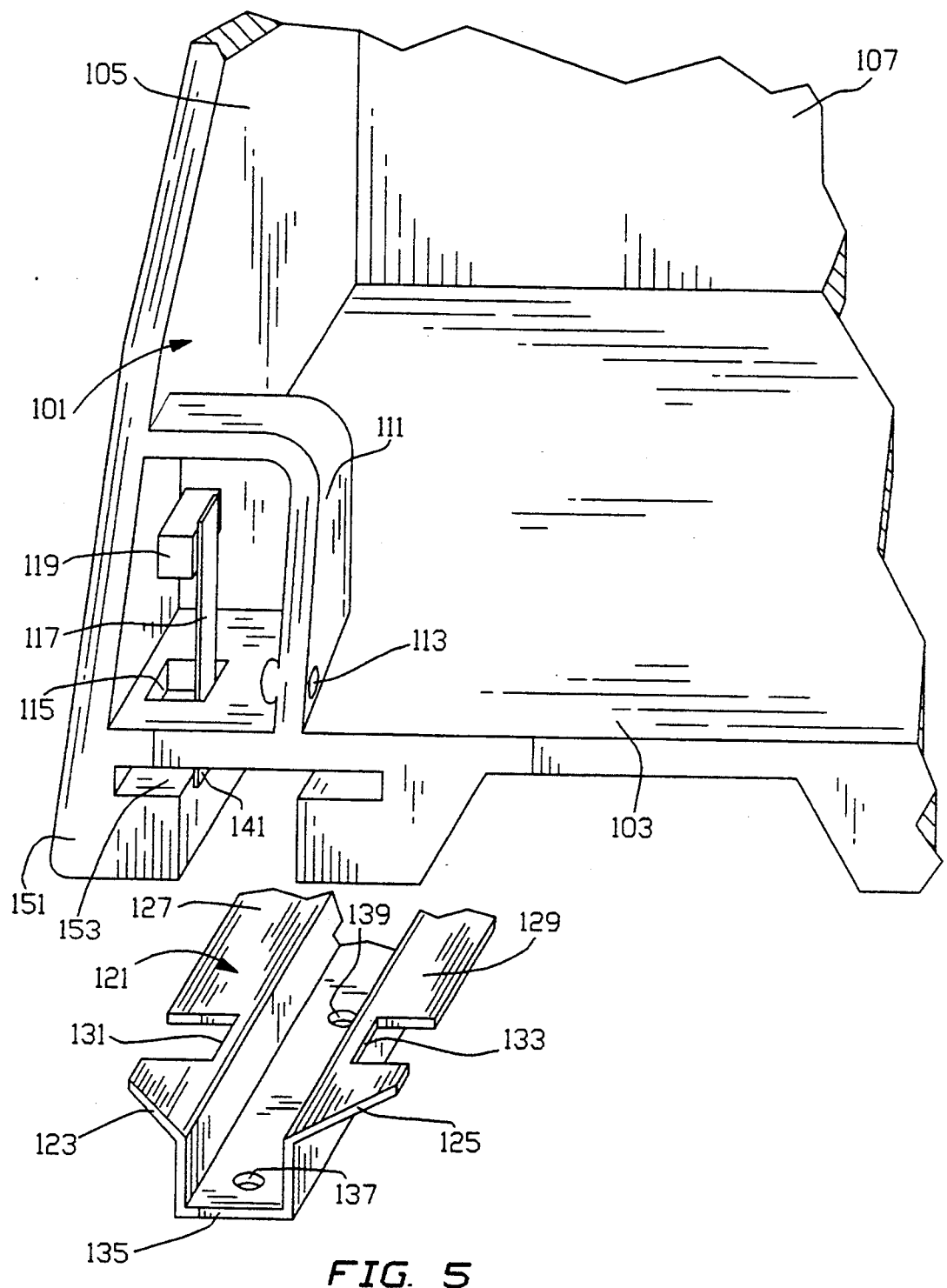
FIG. 5 shows a perspective view of a container, latch and mount of the present invention device; and, FIG. 6 is a front oblique view of the alternative embodiment present invention container with two latches, for mounting to a present invention mount.

As shown in the perspective front view of FIG. 5, container 101 has a bottom 103, walls 105 and 107 and a top (not shown). Compartment 111 has a snap hole 113 for securing the top when closed. Also, located in compartment 111 is opening 115 through which latch 117 affixed to block 119, extends. In the left hand lower corner 151 of container 101 is a "T" slot 153.

Also shown is mount 121 with flanges 127 and 129, base 135 with mounting holes 137 and 139, and strikes 123 and 125. Likewise, detents 131 and 133 are included for receiving latches. Although only one corner is shown, an opposite corner would include a mirror image latch arrangement. Thus, mount 121, having strikes and detents on both flanges could be used with left and right side engaging latches, i.e. on both corners of container 101.

Latch 117 is made of a strong spring material, e.g. spring steel, and when container 101 is slid onto mount 121, it is done so from the rear, i.e. the back of the corner is first slid onto the front of mount 121. Strike 123 pushes the lower end 141 of latch 117 away from the base 135 until it pops into detent 131, thereby securing the container 101. When the container 121 is locked, the latch 117 is inaccessible and cannot be released, thereby preventing unauthorized removal of the container 101 and its contents.

Figure 6:
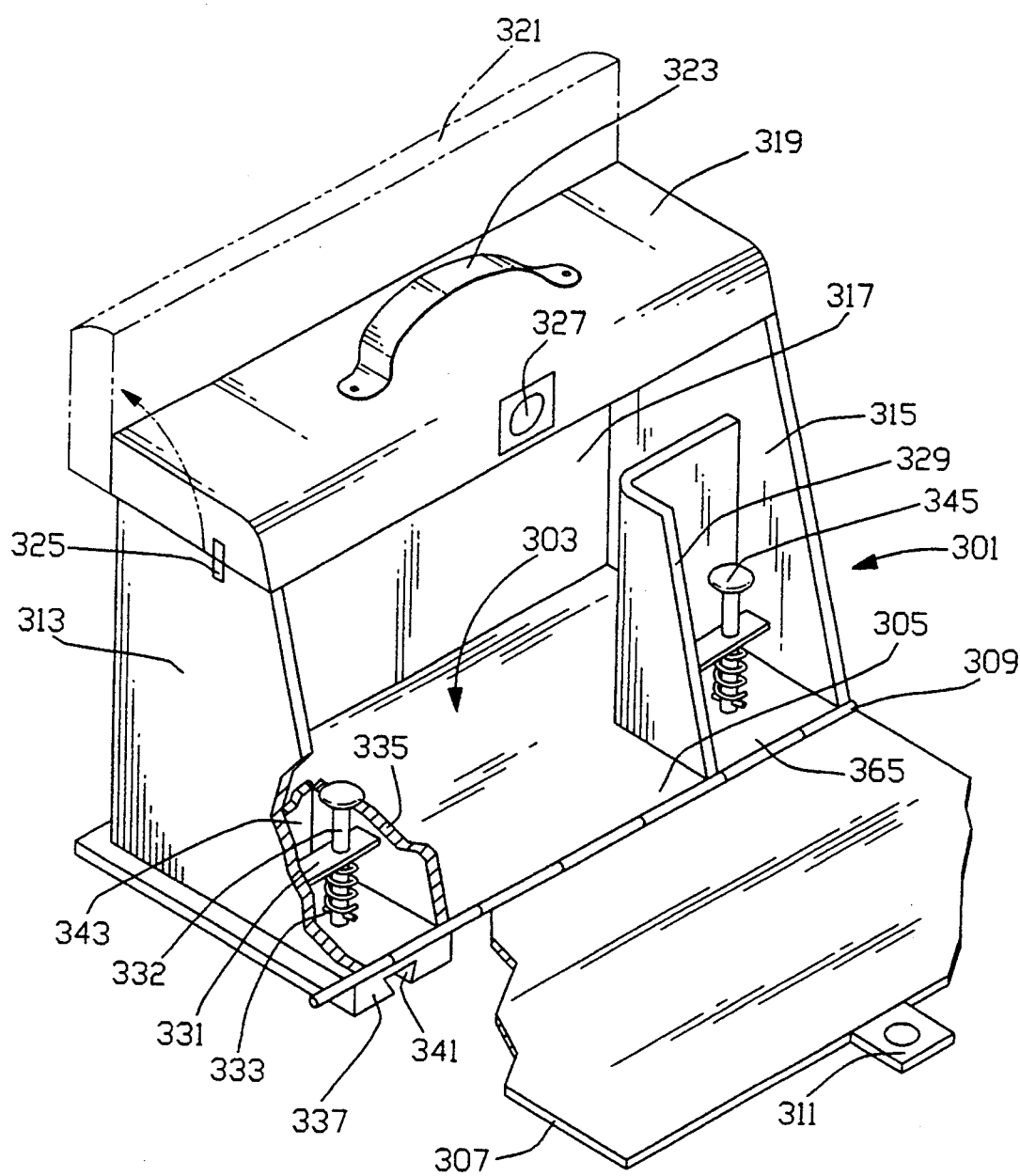

FIG. 6 shows a front perspective view of a present invention enclosed device shown generally as 301. It includes container 303 with bottom 305 permanently attached to base plate 337. Front wall 307 acts as a door and rotates about hinges 309. The container 303 also includes lock 311, sidewalls 313 and 315, back 317 and support cover 319 (shown in its open position as cover 321). It also includes handle 323 and lock receiver 327, as well as latches such as latch 325. Inside walls 335 and 343 form a compartment about latch 332. This latch 332 works in a fashion similar to that shown in FIG. 2, except that it would drop into a hole located within the male counterpart of a mount (not shown) and pass into female counterpart 341 of an interlock. Plate 331 and spring 333 bias latch 332 downwardly for securing the container 303 to a mount (not shown) which itself would be affixed to an item such as a vehicle, Obviously, numerous modifications and variations of the present invention are possible in light of the above teachings. It is therefore understood that within the scope of the appended claims, the invention may be practiced otherwise than as specifically described herein.

What is claimed is:

1. A universal equipment mounting device, comprising, in combination:
    (a) a portable utility container having a bottom, sides and a top and capable of being locked;
    (b) at least one mount adapted for interlocking with said portable utility container, said at least one mount having a continuously identical cross-section for a predetermined length;
    (c) at least one latch attached to either of said portable utility container and said at least one mount, and adapted to interact with the other of said portable utility container and said at least one mount so as to releasably connect said portable utility container to said at least one mount;
    (d) a downwardly biased spring located about said at least one latch for resiliently urging said at least one
    latch into engagement; and,
    further characterized in that one of said portable utility container and said at least one mount contains a male counterpart of a male-female interlock and the other of the said portable utility container and said at least one mount contains a female counterpart of a male-female interlock, said device is adapted such that said portable utility container is slidable onto said at least one mount and is further securable thereto by means of said at least one latch.

2. The device of claim 1 wherein said male-female interlock is a "T" slot interlock.

3. The device of claim 1 wherein said male-female interlock is a trapezoidal interlock.

4. The device of claim 1 wherein said at least one latch is attached to either of said portable utility container and said at least one mount and extends into said container so as to be releasable only from within said container.

5. The device of claim 4 wherein said portable utility container includes a separable compartment therein into which said at least one latch extends.

6. The device of claim 5 wherein said separable compartment is located so as to inherently be inaccessible when said container is locked.

7. The device of claim 1 wherein either of said male and said female counterpart of said male-female interlock includes at least one strike to assist said counterpart in secure alignment with said at least one latch.

8. The device of claim 7 wherein said counterpart further includes a detent into which said latch may rest for securing said portable utility container to said mount.

9. The device of claim 1 wherein said at least one latch is connected to said portable utility container and extends below the bottom of said container for latching interaction with said at least one mount.

* * * * *